UNITED STATES PATENT OFFICE.

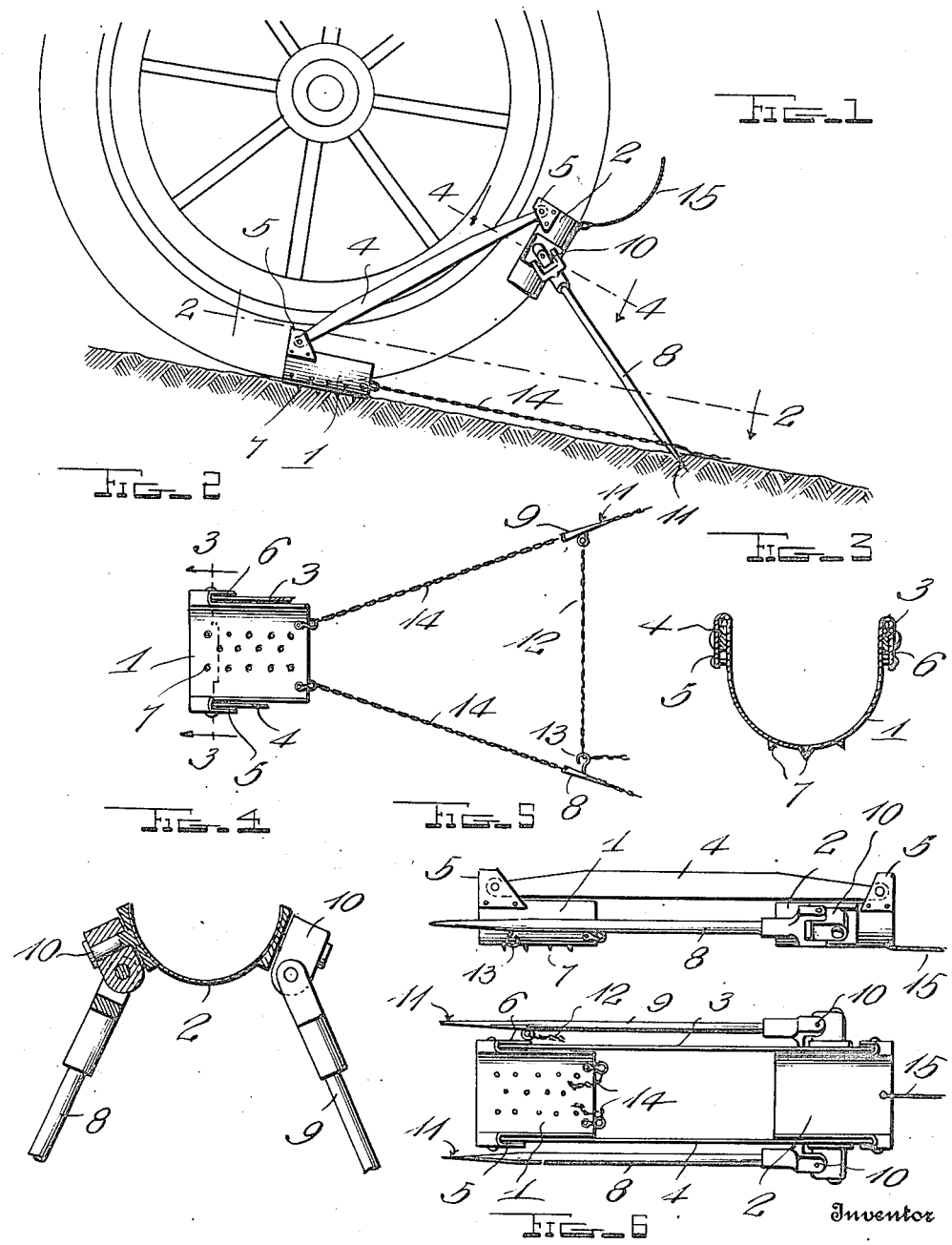

ALBERT CASPER, OF VALLEJO, CALIFORNIA.

VEHICLE-CHOCK.

1,155,549.   Specification of Letters Patent.   Patented Oct. 5, 1915.

Application filed December 7, 1914. Serial No. 875,817.

*To all whom it may concern:*

Be it known that I, ALBERT CASPER, a citizen of the United States, residing at Vallejo, in the county of Solano and State of California, have invented certain new and useful Improvements in Vehicle-Chocks; and I do declare the following to be a full, clear, and exact description of the invention, such as will enable others skilled in the art to which it appertains to make and use the same.

This invention relates to improvements in foldable chocks for vehicles.

The object of the invention is to provide a vehicle chock which is so constructed that it may be quickly opened and applied and readily removed and collapsed into a small space after use to provide for its convenient transportation on the vehicle with which it is to be used.

Another object is to provide a device of this character which will reliably fit the tire of the wheel to which it is to be applied and securely engage the supporting surface of the vehicle to hold it against turning in the direction in which this chock is placed, thereby rendering it especially useful for chocking a vehicle on an upgrade when it is desired to stop for any purpose.

Another object is to provide means for detaching the chock and drawing it into the vehicle without necessitating the driver leaving his seat.

With the above and other objects in view, the invention consists of certain novel features of construction, combination and arrangement of parts as will be more fully described and claimed.

In the accompanying drawings, Figure 1 is a side elevation of this improved chock applied; Fig. 2 is a horizontal section thereof taken on the line 2—2 of Fig. 1; Fig. 3 is a transverse section taken on the line 3—3 of Fig. 2; Fig. 4 is a transverse section taken substantially on line 4—4 of Fig. 1 showing the pivotal connection of the braces with the shoe; Fig. 5 is a side elevation of the chock in folded collapsed position; Fig. 6 is a plan view thereof.

In the embodiment illustrated, two wheel engaging shoes 1 and 2 are shown connected by two links 3 and 4 which are pivotally engaged with said shoes. These shoes are also provided with adjustable supporting means to be described. The shoes 1 and 2 have transversely curved wheel receiving seats constructed to conform to the curvature of the tire of the wheel to which they are to be applied and of a width corresponding to the width of the tire. As shown, these shoes are constructed of sheet metal although they may be formed of any other suitable material and each of them is provided with a pair of lugs 5 and 6 which project from their opposed edges at one end thereof and are here shown folded downwardly and riveted at their terminals to the shoes to provide bearings for the links 3 and 4, the ends of which are disposed between the folded portions of the lugs and pivotally connected therewith to provide for the adjustment of the shoes relatively to the links. The surface engaging shoe 1 is provided on its outer face at the tread portion thereof, with a plurality of surface engaging spurs 7 which are designed to engage the supporting surface of the vehicle and assist in holding the chock in operative position.

Connected to the shoe 2 on opposite sides of the outer face thereof are two supporting braces 8 and 9 which are connected at one end with said shoe, by universal joints 10. These braces 8 and 9 are provided at their free ends with surface engaging spikes 11 which are designed to penetrate the surface on which the vehicle is supported to assist in holding it in chocked position. These braces 8 and 9 are adjustably connected by any suitable means, a chain 12 being here shown connected at one end with one of the braces near its spiked terminal and a hook 13 is provided on the other brace at a point opposite the chain of brace 8 and which is designed to be engaged with one of the links of said chain for adjustably connecting said braces to vary the distance between them. These braces 8 and 9 are adapted to be detachably and adjustably connected with the surface engaging shoe by any suitable means, two chains 14 being here shown connected with the rear end of said shoe 1 at opposite sides thereof and they may be of any suitable or desired length, being connected with the braces by passing the spiked ends 11 thereof through one of the links in the chains and by means of this connection, the pitch of the spiked braces may be varied to suit the height at which it is desired to support the wheel engaging shoe 2.

The lugs 5 and 6 of the surface engaging shoe 1 are disposed at the front end of the shoe while those of the shoe 2 are disposed at the rear end thereof to adapt the links 3 and 4 to provide protective means for the edges of the shoes when in folded or collapsed position.

A flexible element 15 is secured to the rear end of the shoe 2, preferably at the tread thereof and is of a length sufficient to permit the free end thereof to be held by any suitable means at the front of the vehicle so that it may be grasped by the driver to draw the chock into the vehicle after the vehicle has been started, which will release the chock and permit it to be easily pulled forward.

In the operation of this improved chock, the shoes 1 and 2 are opened and the surface engaging shoe positioned at the rear of the vehicle wheel to which it is to be attached as shown in Fig. 1, and the braces 8 and 9 are then adjusted to bring the shoe into engagement with the wheel at a point above that which is engaged by the shoe 1. When in this position, the links 3 and 4 are disposed on opposite sides of the wheel tire and the device is secured in operative position by causing the spiked ends 11 of the braces to be inserted in the surface on which the vehicle is mounted, the chains 14 having first been properly positioned for the passage of these spiked ends through the desired link thereof. It is to be understood that the spread between the braces is preferably adjusted before the braces are passed through the connecting chains 14 but the chain 12 may be adjusted to take up any slack therein such as might occur when the braces are positioned closer together than the length of the chain or the distance between the link which is connected with the hook 13 of the other brace. The universal joints 10 permit these braces to be disposed at any desired angle and they are usually disposed with their engaging spikes placed in planes beyond the planes of the sides of the shoe 1, thereby affording a rigid support for the vehicle to which the chock is applied. While one of these chocks has been described, it is obvious that two of them are preferably employed for chocking the two rear wheels of the vehicle or if found necessary, all four of the wheels may be so chocked. The chocks themselves, being comparatively small, will occupy very little space in the vehicle when transporting them and are ready for use when desired. After a chock has been drawn into the vehicle, the shoes 1 and 2 are folded inwardly against the links 3 and 4 and the braces 8 and 9 are folded inwardly adjacent said shoes. The chains 12 and 14 are then folded into the shoes and the chock is ready to be placed out of the way in any suitable space.

I claim as my invention:—

1. A chock for vehicle wheels comprising a plurality of wheel engaging shoes, means connecting said shoes to locate them at different positions on the periphery of a wheel, surface engaging means carried by one of said shoes, and combined surface engaging and supporting means connected with the other shoe.

2. A chock for vehicle wheels comprising a plurality of wheel engaging shoes, means movably connecting said shoes to locate them at different positions on the periphery of a wheel, surface engaging means carried by one of said shoes, and combined surface engaging and supporting means connected with the other, and means for detachably connecting said supporting means with said first mentioned shoe.

3. A chock for vehicle wheels comprising a plurality of wheel engaging shoes, means movably connecting said shoes to locate them at different positions on the periphery of a wheel, surface engaging means carried by one of said shoes, and combined surface engaging and supporting means connected with the other, and means for detachably and adjustably connecting said supporting means with said first mentioned shoe.

4. A chock for vehicle wheels comprising a plurality of wheel engaging shoes, means movably connecting said shoes to locate them at different positions on the periphery of a wheel, surface engaging means carried by one of said shoes, braces pivotally connected at one end with the other shoe and having spikes at their free ends.

5. A chock for vehicle wheels comprising a plurality of wheel engaging shoes, means movably connecting said shoes, surface engaging means carried by one of said shoes, braces pivotally connected at one end with the other shoe and having spikes at their free ends, and means for adjustably connecting said braces.

6. A chock for vehicle wheels comprising a plurality of wheel engaging shoes, means movably connecting said shoes, surface engaging means carried by one of said shoes, braces pivotally connected at one end with the other shoe and having spikes at their free ends, chains connected at one end with said surface engaging shoe and adapted to be engaged by the spiked ends of said braces.

7. A chock for vehicle wheels comprising a plurality of wheel engaging shoes, means movably connecting said shoes, surface engaging means carried by one of said shoes, braces pivotally connected at one end with the other shoe and having spikes at their free ends, chains connected at one end with said surface engaging shoe and adapted to be engaged by the spiked ends of said braces, a hook on one of said braces, and a chain on the other for detachable and adjustable engagement with said hook.

8. A chock for vehicle wheels comprising a plurality of wheel engaging shoes, links pivotally connected at their opposite ends with said shoes, one of said shoes having surface engaging spurs, supporting braces having universal joint connections at one end with the other shoe and provided with spikes at their free ends, and means for adjustably connecting said braces with said first mentioned shoe.

9. A chock for vehicle wheels comprising a plurality of wheel engaging shoes, links pivotally connected at their opposite ends with said shoes, one of said shoes having surface engaging spurs, supporting braces having universal joint connections at one end with the other shoe and provided with spikes at their free ends, and means for adjustably connecting said braces with said first mentioned shoe, and means for controlling the spread of said braces.

10. A chock for vehicle wheels comprising a plurality of wheel engaging shoes, each curved transversely and having a pair of apertured lugs at one end, links pivotally connected with the apertured lugs of the shoes, braces connected with one of said shoes and having surface engaging means.

In testimony whereof I have hereunto set my hand in presence of two subscribing witnesses.

ALBERT CASPER.

Witnesses:
J. A. GRIESBAUER,
CARL GIOVANNETTI.